United States Patent
Mizuno

(10) Patent No.: US 7,374,812 B2
(45) Date of Patent: *May 20, 2008

(54) LOW REFRACTIVE INDEX COATING COMPOSITION FOR USE IN ANTIREFLECTION POLYMER FILM COATINGS AND MANUFACTURING METHOD

(75) Inventor: Kazuhiko Mizuno, Hachioji (JP)

(73) Assignee: 3M Innovative Properties Company, St. Paul, MN (US)

( * ) Notice: Subject to any disclaimer, the term of this patent is extended or adjusted under 35 U.S.C. 154(b) by 434 days.

This patent is subject to a terminal disclaimer.

(21) Appl. No.: 11/027,189

(22) Filed: Dec. 30, 2004

(65) Prior Publication Data

US 2006/0147724 A1    Jul. 6, 2006

(51) Int. Cl.
*B32B 25/20* (2006.01)
*B32B 27/26* (2006.01)
*C08F 8/00* (2006.01)
*C08L 27/24* (2006.01)
*C08L 83/04* (2006.01)

(52) U.S. Cl. .............. 428/212; 428/323; 428/421; 428/447; 523/205; 525/104

(58) Field of Classification Search .......... 428/212, 428/421, 447, 323; 523/205; 525/104
See application file for complete search history.

(56) References Cited

U.S. PATENT DOCUMENTS

| | | | |
|---|---|---|---|
| 4,035,565 A | 7/1977 | Apotheker et al. | |
| 4,243,770 A | 1/1981 | Tatemoto et al. | |
| 4,970,098 A * | 11/1990 | Ayala-Esquilin et al. | 428/36.4 |
| 4,973,633 A | 11/1990 | Moore | |
| 5,366,772 A * | 11/1994 | Badesha et al. | 428/35.8 |
| 5,591,517 A | 1/1997 | Takamiya et al. | |
| 5,854,342 A | 12/1998 | Kirochko et al. | |
| 5,932,626 A | 8/1999 | Fong et al. | |
| 6,133,373 A | 10/2000 | Kirochko et al. | |
| 6,169,139 B1 | 1/2001 | van Cleeff | |
| 6,238,798 B1 | 5/2001 | Kang et al. | |
| 6,343,865 B1 | 2/2002 | Suzuki | |
| 6,391,433 B2 | 5/2002 | Jiang et al. | |
| 6,693,746 B1 | 2/2004 | Nakamura et al. | |
| 6,905,756 B2 | 6/2005 | Yamamoto et al. | |
| 2002/0001710 A1 | 1/2002 | Kang et al. | |

(Continued)

FOREIGN PATENT DOCUMENTS

EP    0339880    8/1993

(Continued)

OTHER PUBLICATIONS

Hawley's Condensed Chemical Dictionary, 13th Edition, p. 359, Jan. 1999.*

*Primary Examiner*—Ramsey Zacharia
(74) *Attorney, Agent, or Firm*—Carolyn A. Fischer

(57) ABSTRACT

A silicone-modified fluoropolymer is formed by first dissolving a fluoropolymer in an organic solvent, the fluoropolymer having at least one monomer of vinylidene fluoride coupled to a hexafluoropropylene monomer unit, and subsequently reacting the mixture with an amino silane coupling agent to form an aminosilane-modified fluoropolymer. The aminosilane fluoropolymer is subsequently heated and partially condensed with an oligomer of a silane compound including alkoxy silane. The resultant composition is suitable for use as a low refractive index layer in an antireflection coating on an optical substrate.

15 Claims, 1 Drawing Sheet

U.S. PATENT DOCUMENTS

| | | |
|---|---|---|
| 2002/0127408 A1 | 9/2002 | Nishida et al. |
| 2003/0120008 A1 | 6/2003 | Obayashi et al. |
| 2004/0026017 A1 | 2/2004 | Taylor et al. |
| 2004/0096663 A1 | 5/2004 | Yamaguchi et al. |
| 2005/0136252 A1 | 6/2005 | Chisholm et al. |

FOREIGN PATENT DOCUMENTS

| | | |
|---|---|---|
| JP | 60097846 | 5/1985 |
| JP | 2000017099 | 1/2000 |
| JP | 2003-075601 | 3/2003 |
| JP | 2003-103680 | 4/2003 |
| JP | 2003-300286 | 10/2003 |
| JP | 2004-050734 | 2/2004 |
| WO | WO 01/37044 | 5/2001 |
| WO | WO 01/92006 | 12/2001 |

* cited by examiner

LOW REFRACTIVE INDEX COATING COMPOSITION FOR USE IN ANTIREFLECTION POLYMER FILM COATINGS AND MANUFACTURING METHOD

TECHNICAL FIELD AND INDUSTRIAL APPLICABILITY OF THE INVENTION

The present invention relates to a coating composition and more specifically to a low refractive index composition for an antireflection polymer film.

BACKGROUND OF THE INVENTION

Antireflective polymer films ("AR films"), or AR coatings, are becoming increasingly important in the display industry. New applications are being developed for low reflective films and other AR coatings applied to articles used in the computer, television, appliance, mobile phone, aerospace and automotive industries.

AR films are typically constructed by alternating high and low refractive index polymer layers in order to minimize the amount of light that is reflected. Desirable features in AR films for use on the substrate of the articles are the combination of a low percentage of reflected light (e.g. 1.5% or lower) and durability to scratches and abrasions. These features are obtained in AR constructions by maximizing the delta RI between the polymer layers while maintaining strong adhesion between the polymer layers.

It is well known that the low refractive index polymer layers used in AR films are usually derived from fluorine containing polymers ("fluoropolymers" or "fluorinated polymers"), which have refractive indices that range from about 1.3 to 1.4. Fluoropolymers provide unique advantages over conventional hydrocarbon based materials in terms of high chemical inertness (in terms of acid and base resistance), dirt and stain resistance (due to low surface energy), low moisture absorption, and resistance to weather and solar conditions.

The refractive index of fluorinated polymer coating layers is dependent upon the volume percentage of fluorine contained within the layers. Increased fluorine content decreases the refractive index of the coating layers.

However, increasing the fluorine content also decreases the surface energy of the coating layers, which in turn reduces the interfacial adhesion of the fluoropolymer layer to the other polymer or substrate layers to which the layer is coupled.

Other materials investigated for use in low refractive index layers are silicone-containing polymeric materials. Silicone-containing polymeric materials have generally low refractive indices. Further, silicone-containing polymeric coating layers generally have higher surface energies than fluoropolymer-base layers, thus allowing the silicone-containing polymeric layer to more easily adhere to other layers, such as high refractive index layers, or substrates. This added adhesion improves scratch resistance in multilayer antireflection coatings. However, silicone-containing polymeric materials have a higher refractive index as compared with fluorine containing materials. Further, silicone-containing polymeric materials have a lower viscosity that leads to defects in ultra-thin coatings (less than about 100 nanometers).

Thus, it is highly desirable to form a low refractive index layer for an antireflection film having increased fluorine content, and hence lower refractive index, while improving interfacial adhesion to accompanying layers or substrates.

SUMMARY OF THE INVENTION

The present invention provides a composition useful as a low refractive index layer in an antireflection coating and a method for forming the composition.

The present invention combines the unique durability and repellency properties of fluoropolymers with the adhesion advantages of silicone-containing polymeric polymers into a single low refractive index composition.

The present invention provides a silicone-modified fluoropolymer that is formed by first dissolving a fluoropolymer having at least one monomer of vinylidene fluoride coupled to a hexafluoropropylene monomer unit in an organic solvent and subsequently reacting the mixture with an amino silane coupling agent to form an aminosilane-modified fluoropolymer. The aminosilane fluoropolymer is subsequently heated and partially condensed with an oligomer of a silane compound including alkoxy silane. The resultant composition is ideally suited as a low refractive index layer in an AR film because the material shows good wetting to underlying or overlying materials and substrates and further has adequate viscosity performance. The material is durable and relatively easy to manufacture. This material is also suited as a low refractive index layer in a transferable AR film.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

The present invention contemplates a composition useful for use as a low refraction index coating layer in an antireflection coating including a fluoropolymer modified with silicone-based compounds. The resultant composition is particularly suitable as a low refractive index layer in an antireflection coating because the material shows good wetting to underlying or overlying materials and substrates and further has adequate viscosity performance. The material is also available for use in a transferable antireflection material. The composition is easy to manufacture because of its relatively simple synthesis procedure.

As used herein, the term "weight ratio" refers to the relative weight of the components relative to each other based on the coating composition or reaction product thereof unless specified otherwise. Further, the term "percent by weight" or "weight percent" refers to the weight percent solids based on the coating composition or reaction product thereof unless specified otherwise.

Figure 1:
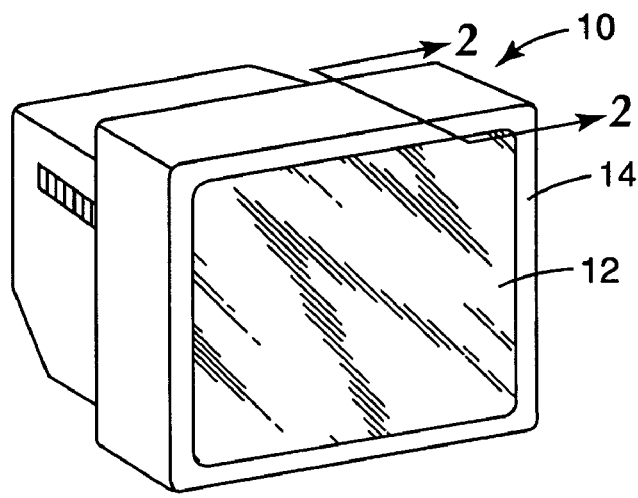
FIG. 1 is perspective view of an article having an optical display.

Referring now to FIG. 1, a perspective view of an article, here a computer monitor 10, is illustrated as having an optical display 12 coupled within a housing 14. The optical display 12 is a substantially transparent material having optically enhancing properties through which a user can view text, graphics or other displayed information.

Figure 2:
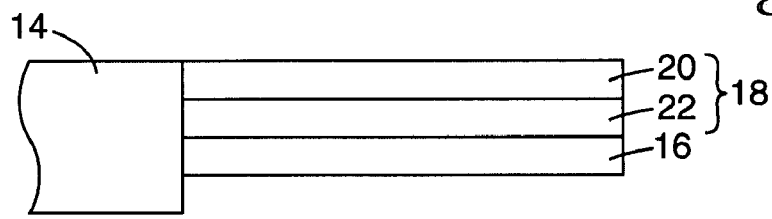
FIG. 2 is a sectional view of the article of FIG. 1 taken along line 2-2 illustrating an antireflection film having a low refractive index layer formed in accordance with a preferred embodiment of the present invention.

As best shown in FIG. 2, the optical display 12 includes an antireflection film 18 coupled (coated) to an optical substrate 16. The antireflection film 18 has at least one layer of a high refraction index layer 22 and a low refractive index layer 20 coupled together such that the low refractive index layer 20 is exposed to the atmosphere while the high refractive index layer 22 is contained between the substrate 16 and low refractive index layer 20.

The high refractive index layer 22 is a conventional carbon-based polymeric composition having a mono and multifunctional acrylate crosslinking system. Exemplary non-limiting high refractive index compositions that may be utilized to form the high refractive index layer 22 in the present invention are described in U.S. Pat. No. 5,932,626 to Fong et al., assigned to Minnesota Mining and Manufacturing Company of St. Paul, Minn.; and U.S. Pat. No. 6,391,433 to Jiang et al., assigned to Hoya Corporation of Tokyo, Japan, both of which are herein incorporated by reference.

The low refraction index layer 20 is designed to be compatible with the high refractive index layer 22 and is formed from the reaction product an oligomer of a silicone alkoxy resin partially condensed with an aminosilane modified fluoropolymer. The method for forming the low refractive index layer 20 is described in further detail below.

Articles with which the present invention can be utilized include, for example, lenses, cathode ray tubes, flat or curved panel displays, window films and windshields. It is understood, of course, that the present invention is not limited to such articles, but can be utilized with any articles within the skill of persons in the art.

While not shown, other layers may be added onto the substrate 16, including, but not limited to, other hard coating layers, adhesive layers, and the like. These layers are formed with conventional hydrocarbon-based compositions that are designed to be compatible with the overlying layers of the antireflection material 18.

Further, the antireflection material 18 may be applied directly to the substrate 16, or alternatively applied to a release layer of a transferable antireflection film and subsequently transferred from the release layer to the substrate using a heat press or photoradiation application technique.

Figure 3:
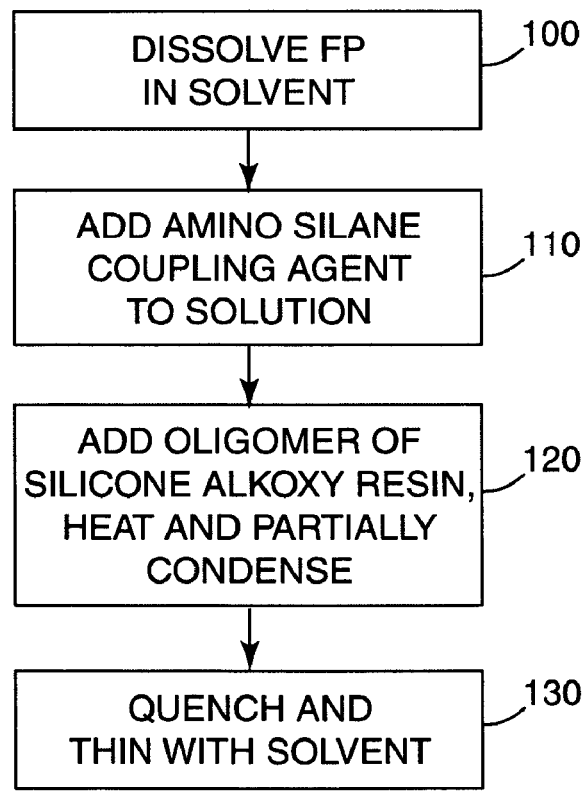
FIG. 3 illustrates a logic flow diagram for forming a low refractive index composition according to a preferred embodiment of the present invention.

FIG. 3 illustrates a logic flow diagram for forming the low refraction index coating composition used in the low refractive index coating layer 20 of FIG. 1 in accordance with one preferred method of the present invention.

To form the antireflection coating composition, as shown in Step 100, a fluoropolymer is first dissolved in a compatible organic solvent. Preferably, the solution is about 10% by weight fluoropolymer and 90% by weight organic solvent.

The preferred fluoropolymer is a copolymer that is formed from the constituent monomers known as (poly)tetrafluoroethylene ("TFE" or "PTFE"), hexafluoropropylene ("HFP"), and (poly)vinylidene fluoride ("VdF," "V₂F," or "PVdF"). The monomer structures for TFE (1), VdF (2), and HFP (3) are shown below:

  (1)

  (2)

  (3)

The fluoropolymer copolymer consists of at least two of the constituent monomers (HFP and VdF), and more preferably all three of the constituent monomers in varying molar amounts. For the purposes of the present invention, a copolymer of all three fluoropolymers shall be hereinafter referred to as THV, while a copolymer consisting of HFP and VdF is hereinafter referred to as FKM (otherwise known as Hexafluoropropylenevinylidenefluoride). The chemical formulas for FKM (4) and THV (5) are shown below:

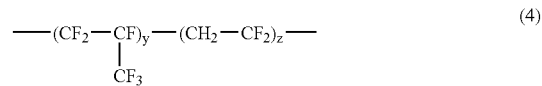

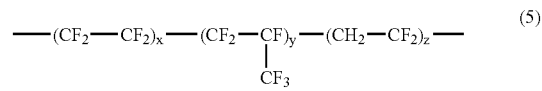

One commercially available form of THV contemplated for use in the present invention is Dyneon Fluorothermoplastic THV 220, a mixture that is manufactured by 3M of Saint Paul, Minn. One commercially available form of FKM is DuPont's Dow Elastomer Viton® A-201C. Useful fluoropolymers are also commercially available, for example from Dyneon LLC, Saint Paul Minn., under the trade names THV 230, THV 500, THV530, Fluorel™ (HFP/VDF), Fluorel-II™ (TFE/PP/VDF), and Kel-F.TM. KF-800, fluoroelastomer; from Elf Atochem North America Inc., under the trade names Kynar™ 740, 2800, 9301; from Kureha Chemical Co. under the trade name KF polymer; from Daikin America, Inc. under the trade name NEOFLUORON VDF; from Central Glass under the trade name Cefral Soft™ G-150, from Asahi Glass Co., Ltd., under the trade name AFLAS™ 200; and from DuPont under the tradename Dow Elastomer Viton® A-201C.

The compatible organic solvent that is utilized in the preferred embodiments of the present invention is methyl ethyl ketone ("MEK"). However, other organic solvents may also be utilized, as well as mixtures of compatible organic solvents, and still fall within the spirit of the present invention. For example, other organic solvents contemplated include methyl isobutyl ketone ("MIBK"), methyl amyl ketone ("MAK"), tetrahydrofuran ("THF"), isopropyl alcohol ("IPA"), and mixtures thereof.

The mechanical durability of the resultant low refractive index layer 20 can be enhanced by the introduction of surface modified inorganic particles to the low refractive index composition.

The inorganic particles preferably have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of 5 nanometers to 100 nanometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. Most preferably, the particles are formed of silicone dioxide ($SiO_2$).

The surface particles are modified with polymer coatings designed to have reactive functionality towards the fluoropolymer component of the fluoropolymer phase. Such functionalities include mercapotan, vinyl, acrylate and others believed to enhance the interaction between the inorganic particles and low index fluoropolymers, especially those containing bromo or iodo cure site monomers. The surface modifications allow further crosslinking of the particle within the polymer network and allow adequate dispersion of the particles in the fluoropolymer matrix.

Next, in Step 110, a solution of amino silane coupling agent, is added to the fluoropolymer solution. One preferred amino silane coupling agent is 3-aminopropyl methoxy silane:

(6)

The mixture is allowed to sit for a sufficient period of time to fully react the mixture to form an amino-silane modified fluoropolymer. In the preferred embodiment of the present invention, the mixture was allowed to react for about 10 days at room temperature.

The reaction mechanism for forming the aminosilane modified fluoropolymer preferentially and substantially occurs at vinylidene fluoride groups that are located next to HFP groups in the THV or FKM molecules. The reaction mechanism is a dehydrofluorination reaction of the VdF group followed by Michael addition reaction and is described chemically below (for illustrative purposes, 3-aminopropyl methoxy silane is utilized as the amino silane coupling agent):

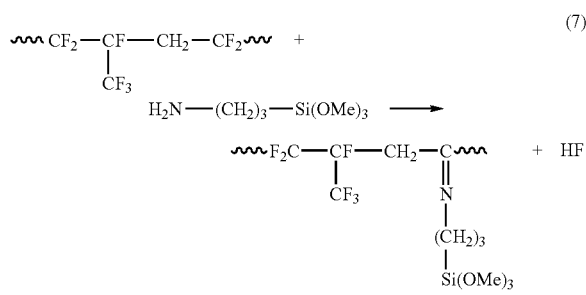
(7)

The reaction is limited by the number of VdF groups coupled to the HFP groups contained in the fluoropolymer. As a result, excess amino silane coupling agent in solution has little, if any, additional chemical effect. The amino silane coupling agent is added in a range of between about 5 and 10 weight percent of the total mixture.

In Step 120, the aminosilane modified fluoropolymer solution is placed into a container and reacted with an oligomer of a silane compound having the chemical formula:

(8)

wherein R1 and R2 are alkyl groups, m is a whole number between 1 and 4, n is a whole number between 0 and 3, and wherein the sum of m and n is 4. Two preferred oligomers that meet these criteria are organic alkoxy silanes and tetraalkoxy silanes. In alternative preferred silane compounding oligomer, a portion of the R1 alkyl may be replaced by an acetyl group.

Preferably, the oligomer of a silane compound is a mixture of organic alkoxy silane and tetraalkoxy silane, with the preferred weight ratio of tetraalkoxy silane to organic alkoxy silane in the resultant composition being between about 2:1 and 3:1. The solids of the mixture are ideally adjusted to between about 2 and 10 weight percent, using a compatible organic solvent that quenches the reaction, and more desirably between about 8 and 10 weight percent. One preferred solvent to quench the reaction and prevent gelation is THF. However, because THF has a low boiling point, a higher boiling point solvent, such as propylene glycol monomethyl ether acetate ("PMA"), is preferably added as a portion of the solvent package.

The container containing the mixture is placed in a heated water bath for between about 1 and 4 hours at between 60 and 80 degrees Celsius in order that the pendent silicone methoxy groups of the amino-silane modified fluoropolymer solution react, via a condensation reaction, with the alkoxy silane portion of the organic alkoxy silane or tetra alkoxy silane. The reaction mechanism for first forming the resultant product, a silicone modified fluoropolymer, mixed with tetramethoxy silane (the tetraalkoxy silane oligomer) and alkyl-trimethoxy silane (the organic alkoxy silane oligomer) is shown below:

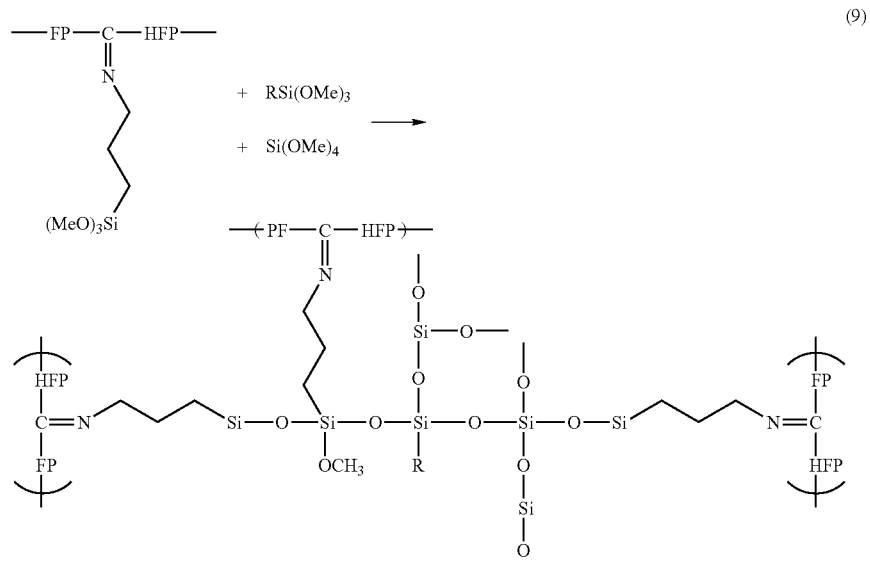
(9)

wherein FP indicates the rest of the fluoropolymer backbone.

Excess tetraalkoxy silane oligomer and organic silane oligomer remaining in the mixture will further react to form three-dimensional crosslinked networks via the following reaction mechanism:

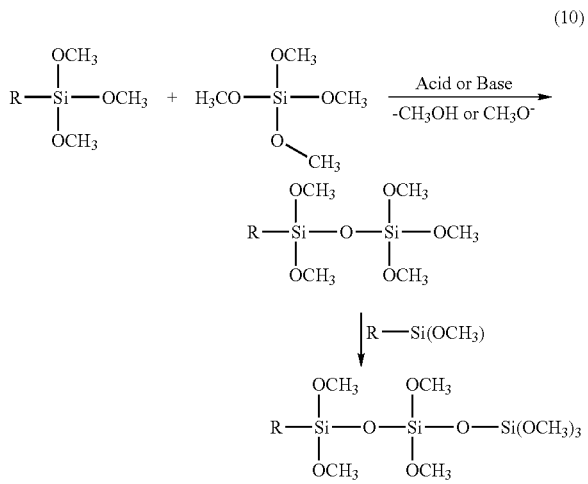

(10)

In Step 130, the resultant product, a silicone modified fluoropolymer, is removed from the water bath and thinned to less than about 10 weight percent solids, and more preferably around 2 weight percent, with an organic solvent. The addition of the solvent, in essence, quenches the reaction, therein preventing further reaction to prevent gelation of the product. THF is the preferred solvent for quenching the resultant product, but exhibits too fast a drying rate to be used in a thin coating. Therefore, it is preferable to utilize a mixture of THF with another compatible high boiling point solvent such as cyclohexanone and MIBK, the mixture amounts depending upon the desired drying rate for the applied coating.

In addition, to increase solution stability, a stabilizing agent such as dibutyltin dilaurate is also added to the final mixture. This stabilizing agent complexes with some of the remaining alkoxy silane in the resultant product. The stabilizing agent is typically added at between about 1 and 3 weight percent of the thinned solution.

The resultant composition is ideally suited as a low refractive index layer because the material shows good wetting to underlying or overlying materials and substrates and further has adequate viscosity performance. The material is easy to manufacture because of its relatively simple synthesis procedure.

EXAMPLES

By the method shown below, three compositions, including a silicone material modified fluoropolymer, were prepared.

Example 1

Preparation of Fluoro-plastic/Silicone Alkoxy Oligomer System ("L-1")

(a) Modification of Fluoroplastic 4 g of THV 220 (Dyneon) were dissolved in MEK and 40 g of a 10 weight percent solution was prepared. In the solution, 255 g of ethyl acetate and 0.74 g of a 60% by weight solution of oligomerized amino silane coupling agent (LJ-292130, Sumitomo 3M) were added and mixed. The solution was allowed to sit in an airtight container for 10 days under ambient conditions. After 10 days, the solution, known as a modified polymer solution, was slightly yellow. The solids percentage was about 1.5 weight percent and the weight ratio of THV 220 to oligomerized amino silane coupling agent was 90/10.

(b) Condensation with Silicone Alkoxy Oligomer 10 g of the modified polymer solution, 0.65 g of an organic alkoxy silane oligomer (SI oligomer 2, GE Toshiba silicone), 0.33 g of an oligo tetra methoxy silane (X40-2308, Shinetsu chemical), 4.9 g of methyl amyl ketone and 9.11 g of Ethyl acetate were mixed in a container. The mixture was applied to a PET substrate material with a Mayer bar, and the resultant coating layer showed a very hazy appearance.

This same mixture was then introduced to a 80° C. water bath for 4 hours. The heated mixture was applied to a PET substrate material with a Mayer bar. Here, the resultant coating layer showed a transparent appearance without haze, which indicates that a reaction has taken place. Measurement of the solids percentage of the heated mixture was 2 weight percent and the weight ratio of Fluoropolymer/Organic silicone oligomer/Oligo methoxy silane in the heated mixture was 23.7/23.7/52.6.

Example 2

Preparation of Fluoro-Plastic/Silicone Alkoxy Oligomer System ("L-2")

(a) Modification of Fluoroplastic 4 g of THV 220 (Dyneon) were dissolved in MEK and 40 grams of a 10 weight percent solution was prepared. In the solution, 240.5 g of THF and 0.21 g of an amino silane coupling agent (KBM-903, Shinetsu chemical) were added and mixed. The solution was then allowed to sit in an airtight container for 10 days under ambient conditions. After 10 days, the solution was slightly yellow. The measured solids percentage of the mixture was about 1.5 weight percent and the weight ratio of THV 220/KBM-903 was measured at 95/5.

(b) Condensation with Silicone Alkoxy Oligomer 10 g of the modified polymer solution, 0.9 g of an organic alkoxy silane oligomer (SI oligomer 2, GE Toshiba silicone), 0.63 g of an oligo tetra methoxy silane (X40-2308, Shinetsu chemical), and 7.23 g of THF were mixed in a container. The mixture was then coated onto a PET substrate material using a Mayer bar, and the resultant coating showed a very hazy appearance.

This same mixture was then introduced to a 80° C. water bath for 2 hours. The heated mixture was applied to a PET substrate material with a Mayer bar. Here, the resultant coating showed a transparent appearance without haze. Measurement of the solids percentage of the heated mixture was 4 weight percent and the weight ratio of F-polymer/Organic silicone oligomer/oligo methoxy silane in the mixture was determined to be 15/22.5/62.5.

Just after reaction completion, 8 g of the reaction product above were thinned by 11.23 of THF and 2.1 g of Cyclohaxanone.

Example 3

Preparation of Fluoro-elastomer/Silicone alkoxy oligomer system ("L-3")

(a) Modification of Fluoroelastomer 40 g of FT-2430 (Dyneon) were dissolved in MEK and 400 grams of a 10 weight percent solution was prepared. In the solution, 1001.4 g of THF and 2.11 g of an amino silane coupling agent (KBM-903, Shinetsu chemical) were added and mixed. This solution was allowed to sit in an airtight container for 10 days under ambient conditions. After 10 days, the solution was slightly yellow. The solids percentage was measured at about 3.0 weight percent and the weight ratio of FT-2430/KBM-903 was determined to be 95/5.

(b) Condensation with Silicone Alkoxy Oligomer 400 g of the modified polymer solution, 72 g of an organic alkoxy silane oligomer (SI oligomer 2, GE Toshiba silicone), 50 g of an oligo tetra methoxy silane (X40-2308, Shinetsu chemical), 24 g of THF and 54 g of PMA were mixed in a container. The mixture was then coated onto a PET substrate material using a Mayer bar, and the resultant coating showed a very hazy appearance.

This same mixture was then introduced to a 80° C. water bath for 1.5 hours. The heated mixture was applied to a PET substrate material with a Mayer bar. Here, the resultant coating showed a transparent appearance without haze. Measurement of the solids percentage was 10 weight percent and the weight ratio of F-polymer/Organic silicone oligomer/Oligo methoxy silane was determined to be 15/22.5/62.5.

Just after reaction completion, 290 g of the reaction product above was thinned by 448.2 g of THF, 502.5 g of MEK, 335 g of MIBK and 172.7 g of Cyclohaxanone. Moreover, 8.7 g of a 10% solution of D-butyl tin dilaurate in MEK was added to the resultant mixture.

Comparison of Results

L-1, L-2, and L-3 were coated on 75 um PET film substrate material with Mayer bar and dried to a target thickness of about 110 nm. For comparative purposes, four samples of commercially available materials were also prepared and applied to a 75 um PET film substrate material at a similar thickness (between 95 and 110 nm) and evaluated versus L-1, L-2 and L-3. These commercially available materials were a 1.5% solution of THV 220 in ethyl acetate ("C-1"), TMO11 (JSR) contained in MIBK ("C-2"), a commercially available solution of an oligo organo silane material, SI oligomer 2 (GE Toshiba silicone), thinned in IPA ("C-3"), and a commercially available oligo organo silane material, KR-400 (Shinetsu chemical), thinned in IPA ("C-4")

The samples were then compared for spectral reflectance and surface quality (in terms of a uniform or non-uniform smooth surface). To measure spectral reflectance, a black acrylic board was attached to a coating sheet on the opposite side of the low refractive index side. The spectral reflectance at 550 nm was measured by a spectrometer, F-20 (Filmetrics).

TABLE I

| Material | Reflectance (%) | Surface observation |
|---|---|---|
| L-1 | 0.50 | Good |
| L-2 | 0.54 | Good |
| L-3 | 0.54 | Good |
| C-1 | 0.77 | Good |
| C-2 | 1.18 | Non-uniform |
| C-3 | 1.57 | Good |
| C-4 | — | Not good |

As shown in Table I, samples embodying the principals of the present invention (L-1, L-2, and L-3) showed improved spectral reflectance properties as compared with all of the control samples. Further, the surface appearance of L-1, L-2 and L-3 was also as good as, and in many cases better, than the surface quality of the control samples.

While the invention has been described in terms of preferred embodiments, it will be understood, of course, that the invention is not limited thereto since modifications may be made by those skilled in the art, particularly in light of the foregoing teachings.

What is claimed is:

1. A silicone modified fluoropolymer composition useful as low refractive index antireflection coating layer, the composition comprising the reaction product of:
    a fluoropolymer having at least one hexafluoropropylene monomer unit coupled to a vinylidene fluoride monomer unit;
    an amino silane coupling agent reacted with said one of said at least one vinylidene fluoride monomer unit; and
    an oligomer of a silicone alkoxy resin partially condensed with said amino silane coupling agent, wherein said oligomer of said silicone alkoxy resin comprises a mixture of a fluoroalkyl-trimethoxy silane resin and a tetraalkoxy silane resin.

2. The composition of claim 1, wherein a portion of Ri comprises an acetyl group.

3. The composition of claim 1, wherein said fluoropolymer is selected from the group consisting of THV and FKM.

4. The composition of claim 1, wherein said amino silane coupling agent comprises an aminoalkoxysilane coupling agent.

5. The composition of claim 4, wherein said aminoalkoxysilane coupling agent comprises 3-aminopropyl methoxy silane.

6. The composition of claim 1, wherein the weight ratio of said tetraalkoxy silane resin to said fluoroalkyl-trimethoxy silane resin in said mixture is between about 2:1 and 3:1.

7. The composition of claim 1 further comprising a stabilizing agent.

8. The composition of claim 7, wherein said stabilizing agent comprises dibutyltin dilaurate.

9. The composition of claim 1 further comprising a plurality of inorganic particles having an average particle size of between about 5 and 100 nanometers.

10. The composition of claim 9, wherein said plurality of inorganic particles comprise a plurality of surface modified inorganic particles having an average particle size of between about 5 and 100 nanometers.

11. An article having an optical display, the optical display comprising:

(a) an optical substrate; and (b) an antireflection coating coupled to said optical substrate, said antireflection coating comprising a high refractive index layer and a low refractive index layer, wherein said low refractive index layer is formed from a low refractive index composition, said low refractive index composition comprising the reaction product of:

a fluoropolymer having at least one hexafluoropropylene monomer unit coupled to a vinylidene fluoride monomer unit;

an aminosilane coupling agent reacted with said one of said at least one vinylidene fluoride monomer unit; and an oligomer of a silicone alkoxy resin partially condensed with said amino silane coupling agent, wherein said oligomer of said silicone alkoxy resin comprises:

Si—(OR1 )mR2n wherein m is a whole number between 1 and 4 and n is a whole number between 0 and 3 such that m+n=4; and wherein R1 and R2 are alkyl groups.

12. The optical display of claim 11, wherein a portion of R1 comprises an acetyl group.

13. The optical display of claim 11, wherein said fluoropolymer is selected from the group consisting of THV and FKM.

14. The optical display of claim 11 further comprising a plurality of inorganic particles having an average particle size of between about 5 and 100 nanometers.

15. The optical display of claim 14, wherein said plurality of inorganic particles comprise a plurality of surface modified inorganic particles having an average particle size of between about 5 and 100 nanometers.

* * * * *

UNITED STATES PATENT AND TRADEMARK OFFICE
CERTIFICATE OF CORRECTION

PATENT NO.        : 7,374,812 B2
APPLICATION NO.   : 11/027189
DATED             : May 20, 2008
INVENTOR(S)       : Kazuhiko Mizuno It is certified that error appears in the above-identified patent and that said Letters Patent is hereby corrected as shown below:

Column 4
Line 19, Delete "Dyneon" and insert -- Dyneon™ --, therefor.

Column 5
Line 4, Delete "mercapotan" and insert -- mercaptan --, therefor.

Column 7
Line 20, delete "R—Si(OCH$_3$)" and insert -- R—Si(OCH$_3$)$_3$ --, therefor.

Column 9
Line 58-59, After "("C-4")" insert -- . --.

Column 10
Line 41, In Claim 2, delete "Ri" and insert -- R1 --, therefor.

Column 12
Line 3, In Claim 11, delete "Si—(OR1)mR2n" and insert -- Si—(OR1)$_m$R2$_n$ --, therefor.

Signed and Sealed this

Fifth Day of August, 2008

JON W. DUDAS
*Director of the United States Patent and Trademark Office*